No. 755,363. PATENTED MAR. 22, 1904.
T. M. COTTLE.
DEVICE FOR EXTERMINATING INSECTS ON PLANTS.
APPLICATION FILED JAN. 8, 1904.
NO MODEL. 2 SHEETS—SHEET 1.
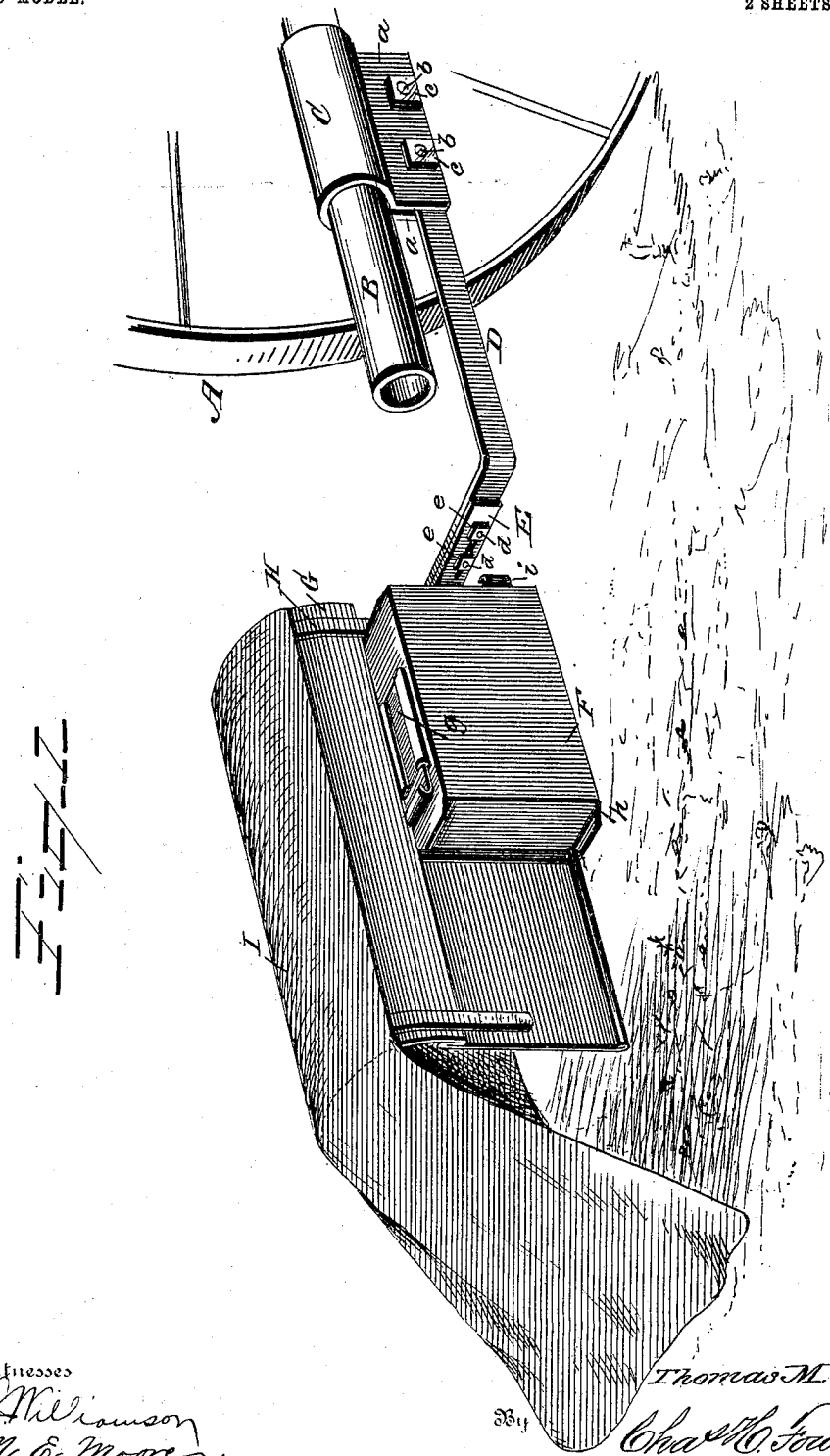
Witnesses
Inventor
Thomas M. Cottle.
Attorney

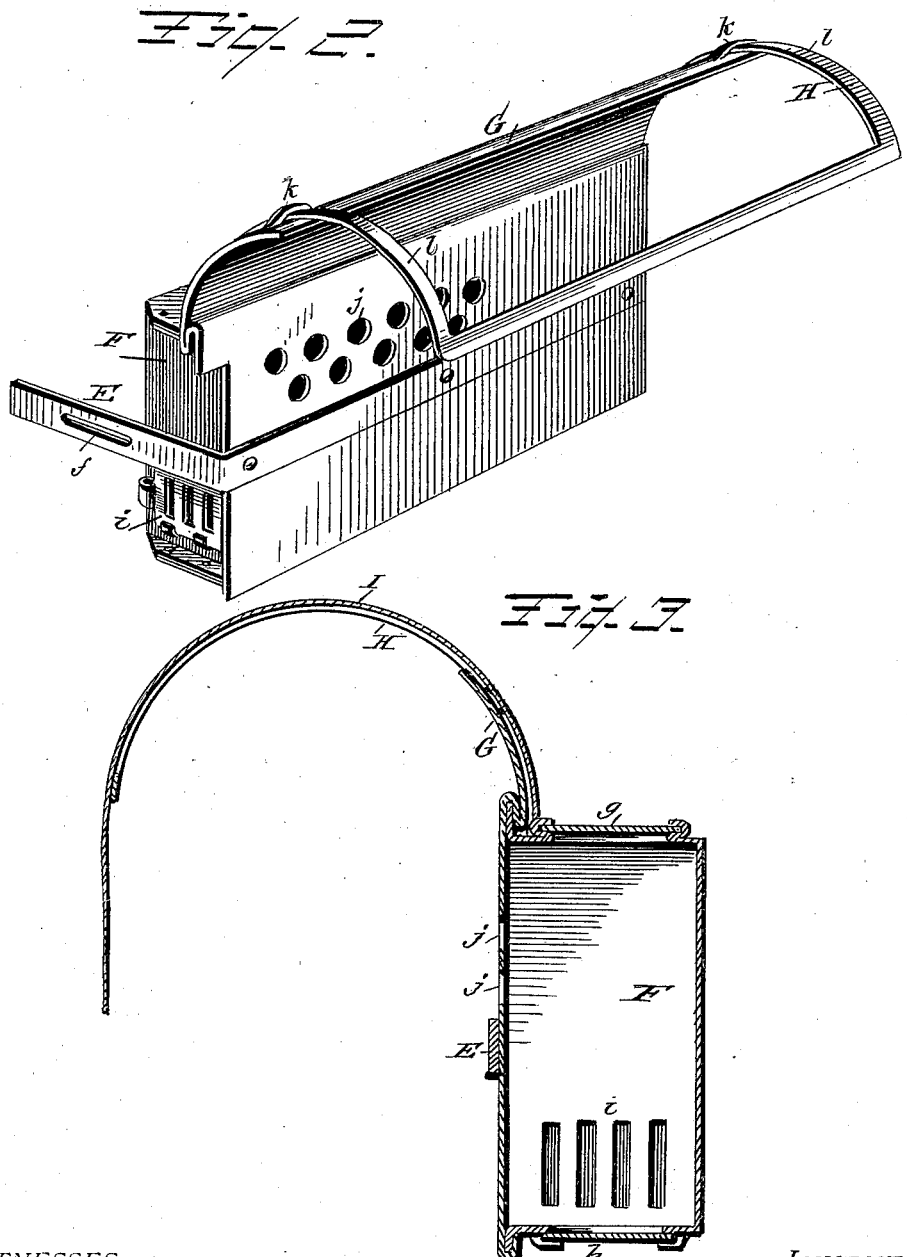

No. 755,363. Patented March 22, 1904.

UNITED STATES PATENT OFFICE.

THOMAS M. COTTLE, OF MOUNTCALM, TEXAS.

DEVICE FOR EXTERMINATING INSECTS ON PLANTS.

SPECIFICATION forming part of Letters Patent No. 755,363, dated March 22, 1904.

Application filed January 8, 1904. Serial No. 188,229. (No model.)

*To all whom it may concern:*

Be it known that I, THOMAS M. COTTLE, a citizen of the United States, residing at Mountcalm, in the county of Hill and State of Texas, have invented certain new and useful Improvements in Devices for Exterminating Insects on Plants; and I do hereby declare that the following is a full, clear, and exact description of the same, reference being had to the annexed drawings, making a part of this specification, and to the letters of reference marked thereon.

The object of the present invention is to provide a convenient and practical device for applying smoke and fumes to the cotton-plant at any stage of growth, as well as to other plants, whereby any insect which may prey upon the plant or its fruits may be effectually exterminated; and it consists in a device constructed substantially as shown in the drawings and hereinafter described and claimed.

Figure 1 of the drawings is a perspective view of my improved device, showing it connected to the rear end of a cultivator or other wheeled vehicle; Fig. 2, a perspective view of the device with the apron removed; Fig. 3, a sectional elevation showing the apron in place over the supporting-frame.

In the accompanying drawings, A represents a portion of the wheel of a cultivator or other like vehicle having a supporting-arm B, which is preferably tubular and projecting from the rear end of the vehicle in any suitable manner. To this arm is connected a clamping-sleeve C, having wings $a$, through which pass the bolts $b$, provided with nuts $c$, which engage the screw-threaded ends of the bolts, and by turning the nuts in the proper direction the wings will be brought together and tighten the sleeve around the supporting-arm, and by loosening the nuts the sleeve can be moved along the arm to any position desired, thereby rendering the sleeve adjustable on the arm and conveniently held in its adjusted position. The bolts $b$ extend through holes in an angle-brace D, and by the bolts and nuts hereinbefore described the brace is held between the wings of the sleeve C perfectly rigid and stationary.

The outer end of the angle-brace D connects with an angle-brace E through the medium of the bolts $d$ and nuts $e$, which bolts extend through an elongated slot $f$ in the latter-mentioned brace, and the longest arm of said brace extends lengthwise of the combustion-chamber or fire-box at the front thereof and throughout its length and is riveted or otherwise secured thereto, whereby a reinforce is provided to the box F, as shown in Fig. 2 of the drawings.

By means of the elongated slot $f$ and the bolts $d$ and nuts $e$ the position of the fire-box F may be adjusted as circumstances require, said box having a slidable door $g$ of any preferred construction, through which the fuel may be deposited in the box, a slidable door $h$ at the bottom of the box, whereby the same may be emptied of its contents, ventilator or register $i$, and holes $j$ for the escape of the smoke. These several features of the combustion-chamber or fire-box to provide means for supplying the box with fuel, emptying the same, providing ventilation to the box to control the process of combustion, and means for the escape of the smoke or products of combustion may be variously modified or changed in their construction without in any manner departing from the essential features of the invention.

The upper portion of the box F is provided with a curved hood G, to which is adjustably connected a curved frame H for supporting the apron I, which may be of cloth or other flexible material, the hood and the front side of the box being preferably constructed of one and the same piece of metal, and as the smoke or fumes pass out through the holes $j$ it will be deflected by the apron upon the plants.

One of many means that may be provided for rendering the curved frame H adjustable resides in the loops $k$, in which the arms $l$ of the frame engage and slide, as shown in Fig. 2 of the drawings, the frictional contact of the arms with the loops holding the frame in its adjusted position.

The adjustability of the curved frame H enables the support for the apron I to be made larger or smaller, so that a greater or smaller area of deflecting-surface for the smoke or fumes may be secured when the apron is placed over the frame, as circumstances may require.

The wall of the front of the fire-box F extends some distance beyond the end thereof, as shown in Fig. 1 of the drawings, so as to give a greater surface lengthwise to the hood G and also to enable as long an apron as possible to be used.

In constructing the combustion-chamber or fire-box and the various attachments thereto it is evident that any suitable material may be used and any suitable metal for the box and the box may be of any desirable size and shape as found best adapted to the purpose, as well as making the boxes to adapt them to be used on either the right or left of the cultivator or other wheeled vehicle, and any chemicals may be used to produce the desired smoke or fumes necessary to the destruction of the pests or insects that may infest or prey upon the plant.

The device as herein constructed is not only very simple, but most practical in its results and requiring no experience in its use and will effectually exterminate all germs or insects that infest and destroy the cotton or other plant.

A suitable fuel—such as wood, coal, or other slow-burning material—may be used in connection with a suitable chemical producing a poison to the insect, the canvas apron covering the row of plants deflecting the poisonous fumes over the same and retaining the fumes a sufficient time to permeate the fruitage and foliage of the plant.

There are many changes or modification in the general construction of the fire-box and its attachments that may be made and still come within the scope of the invention, and any such changes as would come within ordinary mechanical judgment may be resorted to without departing from the spirit of the invention.

Having now fully described my invention, what I claim as new, and desire to secure by Letters Patent, is—

1. A device for destroying insects on plants, comprising a suitable fire-box, means for allowing the smoke or fumes to escape, a curved hood and a curved frame projecting therefrom and an apron extending over the frame, and suitable means for adjustably connecting the device to a wheeled vehicle, substantially as and for the purpose set forth.

2. A device for destroying insects on plants, comprising a suitable fire-box provided with means for the escape of the smoke or fumes, a curved hood projecting from the fire-box, a suitable frame adjustably connected thereto, an apron extending over the frame, and means for connecting the device to a wheeled vehicle, substantially as and for the purpose described.

3. A device for destroying insects on plants, comprising a suitable fire-box with means for the escape of the smoke or fumes, an apron and a suitable support therefor, a suitable clamp adapted to be adjustably connected to an arm upon a wheeled vehicle, an angle-brace connecting with the clamp, an angle-brace connected to the fire-box and adjustably connected to the brace connecting with the clamp, substantially as and for the purpose specified.

4. A device for destroying insects on plants, comprising a suitable fire-box provided with means for the escape of the smoke or fumes, a curved apron extending from the fire-box, a curved frame adjustably connected thereto, a suitable apron extending over the frame, and means for adjustably connecting the device to a wheeled vehicle, substantially as and for the purpose set forth.

In testimony whereof I affix my signature in presence of two witnesses.

THOMAS M. COTTLE.

Witnesses:
W. D. ESTES,
JOSEPH ROY.